United States Patent [19]

Wagner

[11] Patent Number: 5,072,500
[45] Date of Patent: Dec. 17, 1991

[54] APPARATUS FOR REMOVING A COVER FROM AND APPLYING A COVER TO A TOP ROLL MANDREL

[76] Inventor: Robert Wagner, Rte. 3, Box 369-5, Goldsboro, N.C. 27530

[21] Appl. No.: 583,038

[22] Filed: Sep. 14, 1990

[51] Int. Cl.⁵ .............................................. B23P 19/04
[52] U.S. Cl. ....................................... 29/234; 29/235; 29/255; 29/282
[58] Field of Search .............. 29/234, 235, 255, 281.1, 29/281.4, 282

[56] References Cited

U.S. PATENT DOCUMENTS

| | | | |
|---|---|---|---|
| 1,707,640 | 4/1929 | Pade . | |
| 1,709,942 | 4/1929 | Leguillon . | |
| 1,711,475 | 10/1929 | Stevens . | |
| 2,426,401 | 8/1947 | Mack | 29/234 |
| 3,138,859 | 6/1964 | Edwards | 29/234 X |
| 3,139,677 | 7/1964 | Goldstein | 29/234 X |
| 3,156,038 | 11/1964 | Donofrio | 29/234 |
| 4,026,003 | 5/1977 | Leone et al. | 29/235 X |
| 4,138,778 | 2/1979 | Marzoli | 29/235 |
| 4,177,546 | 12/1979 | Geisinger | 29/235 |
| 4,573,251 | 3/1986 | Hillyard | 29/450 |
| 4,677,872 | 7/1987 | Nishida et al. | 29/235 X |
| 4,711,011 | 12/1987 | Nugier | 29/234 X |

FOREIGN PATENT DOCUMENTS

0279509 12/1986 Japan ........................... 29/234

OTHER PUBLICATIONS

Armstrong brochure IP-107-1279Y, pp. 11-13.

Primary Examiner—Timothy V. Eley
Assistant Examiner—C. Richard Martin
Attorney, Agent, or Firm—III Adams

[57] ABSTRACT

An apparatus for removing a cylindrical tubular elastomeric cover from and applying a cylindrical tubular elastomeric cover to a cylindrical top roll mandrel of a top roll. An attachment holder holds a selected cover removing or cover applying attachment. A cover applying attachment is held by the attachment holder for carrying a top roll cover to be applied to the top roll mandrel. A cover stripping attachment is provided for being held by the attachment holder and for stripping a cover from a top roll mandrel. A chuck is provided for holding a top roll mandrel with a cover to be removed by the cover stripping attachment, or a top roll mandrel without a cover for receiving a cover applied by the cover applying attachment. A piston and cylinder assembly moves the top roll mandrel reciprocally to and from the attachment holder and the cover applying attachment or the cover stripping attachment held by the attachment holder to thereby apply a cover to or remove the cover from the top roll mandrel.

4 Claims, 16 Drawing Sheets

APPARATUS FOR REMOVING A COVER FROM AND APPLYING A COVER TO A TOP ROLL MANDREL

TECHNICAL FIELD AND BACKGROUND OF THE INVENTION

This invention relates to an apparatus and method for removing a cover from and applying a cover to a top roll mandrel. The top roll referred to in this application is of the type generally described as a "top roll." These types of rolls are used on combing machines, cards, draw frames and similar textile machines. Generally they engage steel rollers with textile fiber in sliver form passing between the top roll and the steel roll. The top rolls are fabricated by placing a cylindrical tubular elastomeric cover over a steel top roll mandrel. The mandrel includes end portions of reduced diameter by which the mandrel is held in position engaging the adjacent surface of the steel roll against which it operates. As used in this application the term "top roll" refers to the combination of the steel top roll mandrel with the elastomeric cover in position over the mandrel. The term "top roll mandrel" or "mandrel" refers to the bare steel roll without a cover applied.

The elastomeric cover has an inner diameter which is less than the outer diameter of the mandrel onto which the cover is placed. For this reason, the cover must be stretched so that the cover will fit over the outer surface of the mandrel. The mandrel is coated with an adhesive which, in combination with the grip of the cover, holds the cover securely on the mandrel. The covers need replacement periodically. Constant high-speed rotation against the steel rollers wears and hardens the elastomeric cover. Prior art methods of removing the cover from the mandrel include cutting the cover with a sharp blade, or grinding or lathing the cover from the mandrel. These are expensive, time consuming and sometimes hazardous processes.

This invention relates to an apparatus which is adaptable to both apply a cover to and remove, or strip, a worn out cover from the top roll mandrel. The application of the cover to and removal from the mandrel is quick, inexpensive and safe.

SUMMARY OF THE INVENTION

Therefore, it is an object of the invention to provide an apparatus for removing a cover from and applying a cover to a top roll mandrel.

It is another object of the invention to provide a method for removing a cover from and applying a cover to a top roll mandrel.

It is another object of the invention to provide an apparatus and method wherein the application of the cover to and removal from the mandrel is quick, inexpensive and safe.

These and other objects of the present invention are achieved in the preferred embodiments disclosed below by providing an apparatus for removing a cylindrical tubular elastomeric cover from and applying a cylindrical tubular elastomeric cover to a cylindrical top roll mandrel of a top roll which includes attachment holding means for holding a selected cover removing or cover applying attachment, a cover applying attachment for being held by the attachment holding means and for carrying a top roll cover to be applied to the top roll mandrel, and a cover stripping attachment for being held by the attachment holding means and for stripping a cover from a top roll mandrel. A top roll holding means is provided for holding a top roll mandrel with a cover to be removed by the cover stripping attachment or a top roll mandrel without a cover for receiving a cover applied by the cover applying attachment. Top roll movement means hold a top roll mandrel for reciprocal movement to and from the attachment holding means and the cover applying attachment or the cover stripping attachment held by the attachment holding means to thereby apply a cover to or remove the cover from the top roll mandrel.

According to one preferred embodiment of the invention, the cover applying attachment comprises a tube for receiving a cover to be applied to the top roll mandrel therein and cover expansion means for expanding the cover to an inner diameter sufficient to apply the cover onto the top roll mandrel.

Preferably, the top roll holding means comprises a chuck and the top roll movement means comprises a pneumatic piston and cylinder assembly for reciprocating the chuck and a top roll mandrel carried in the chuck to and from the attachment holding means.

According to another preferred embodiment of the invention, the cover expansion means comprises sealing means for sealing opposing ends of the cover and pneumatic inflation means for inflating the cover to increase its diameter sufficiently to permit the top roll mandrel to be received therein.

According to yet another preferred embodiment of the invention, the cover removing means comprises a tube having an inner diameter slightly greater than the outer diameter of the top roll mandrel and substantially smaller than the outer diameter of the cover whereby when the tube is forced against one end of the top roll the cover is progressively stripped from the top roll mandrel as the top roll mandrel passes into the tube.

According to one preferred embodiment of the invention, an apparatus for applying a cylindrical tubular elastomeric cover to a cylindrical top roll mandrel of a top roll, comprising attachment holding means for holding a cover applying attachment, a cover applying attachment for being held by the attachment holding means and for carrying a top roll cover to be applied to the top roll mandrel, and top roll holding means for holding a top roll mandrel without a cover for receiving a cover applied by the cover applying attachment. Top roll movement means hold a top roll for reciprocal movement to and from the attachment holding means and the cover applying attachment held by the attachment holding means to thereby apply a cover to the top roll mandrel.

According to yet another preferred embodiment of the invention, the cover applying attachment comprises a tube for receiving a cover to be applied to the top roll mandrel therein and cover expansion means for expanding the cover to an inner diameter sufficient to apply the cover onto the top roll mandrel.

Preferably, the top roll holding means comprises a chuck and the top roll movement means comprises a pneumatic piston and cylinder assembly for reciprocating the chuck and a top roll mandrel carried in the chuck to and from the attachment holding means.

According to yet another preferred embodiment of the invention, the cover expansion means comprises sealing means for sealing opposing ends of the cover and pneumatic inflation means for inflating the cover to increase its diameter sufficiently to permit the top roll mandrel to be received therein.

According to yet another preferred embodiment of the invention, an apparatus is provided for removing a cylindrical elastomeric cover from a cylindrical top roll mandrel of a top roll comprising attachment holding means for holding a cover removing attachment, a cover stripping attachment for being held by the attachment holding means and for stripping a cover from a top roll mandrel, top roll holding means for holding a top roll mandrel with a cover to be removed by the cover stripping attachment, and top roll movement means for holding a top roll mandrel for reciprocal movement to and from the attachment holding means and the cover stripping attachment held by the attachment holding means to thereby remove the cover from the top roll mandrel.

Preferably, the top roll holding means comprises a chuck and the top roll movement means comprises a pneumatic piston and cylinder assembly for reciprocating the chuck and a top roll mandrel carried in the chuck to and from the attachment holding means.

Preferably, the cover removing means comprises a tube having an inner diameter slightly greater than the outer diameter of the top roll mandrel and substantially smaller than the outer diameter of the cover whereby when the tube is forced against one end of the top roll the cover is progressively stripped from the top roll mandrel as the top roll mandrel passes into the tube.

According to one preferred embodiment of the invention, a method for applying a cylindrical elastomeric cover to a top roll mandrel of a top roll comprises the steps of providing a tubular cover holder for holding a cover to be applied to surface of a top roll mandrel, the cover holder having a inner diameter greater than the outer diameter of the cover to be placed in the cover holder, and a rear wall.

Pneumatic pressure is provided to the interior of the tubular cover holder and a cylindrical tubular elastomeric cover is inserted in the cover holder. A top roll mandrel holder is provided for holding a top roll mandrel to be covered. A top roll mandrel is inserted in the top roll mandrel holder. The top roll mandrel is then moved against the one end of the cover in the tubular cover holder to seal one end of the cover against the rear wall of the cover holder and to seal the other end of the cover against the top roll mandrel to form an enclosure within the cylindrical tubular elastomeric cover. Sufficient air pressure is introduced into the sealed interior of the cylindrical tubular elastomeric cover to inflate the cover against the inner walls of the cover holder.

The top roll mandrel is inserted into the cover while inflated to position the cover on the top roll mandrel and the top roll mandrel with the cover positioned thereon is removed from the cover holder.

According to yet another preferred embodiment of the invention, wherein the step of moving the top roll mandrel against the one end of the cover in the tubular cover holder includes the step of providing a pneumatic piston and cylinder assembly for moving the top roll mandrel in axial alignment with the axis of the cover to be applied to the top roll mandrel.

According to yet another preferred embodiment of the invention, the step of providing pneumatic pressure to the interior of the tubular cover holder includes the step of providing a pneumatic inlet port in the rear wall of the tubular cover holder.

According to yet another preferred embodiment of the invention, a method for stripping a cylindrical elastomeric cover from a top roll mandrel of a top roll and comprises the steps of providing a cover stripping tube having an inner diameter slightly greater than the outer diameter of the top roll mandrel and substantially smaller than the outer diameter of the cover and forcing the top roll axially against one end of the cover stripping tube whereby the cover is progressively stripped from the top roll mandrel as the top roll mandrel passes into the tube.

Preferably, the step of forcing the top roll against the cover stripping tube includes the step of providing a pneumatic piston and cylinder assembly for moving the top roll against the cover stripping tube in axial alignment with the axis of the cover stripping tube.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

I. General Description of Apparatus

Figure 1:
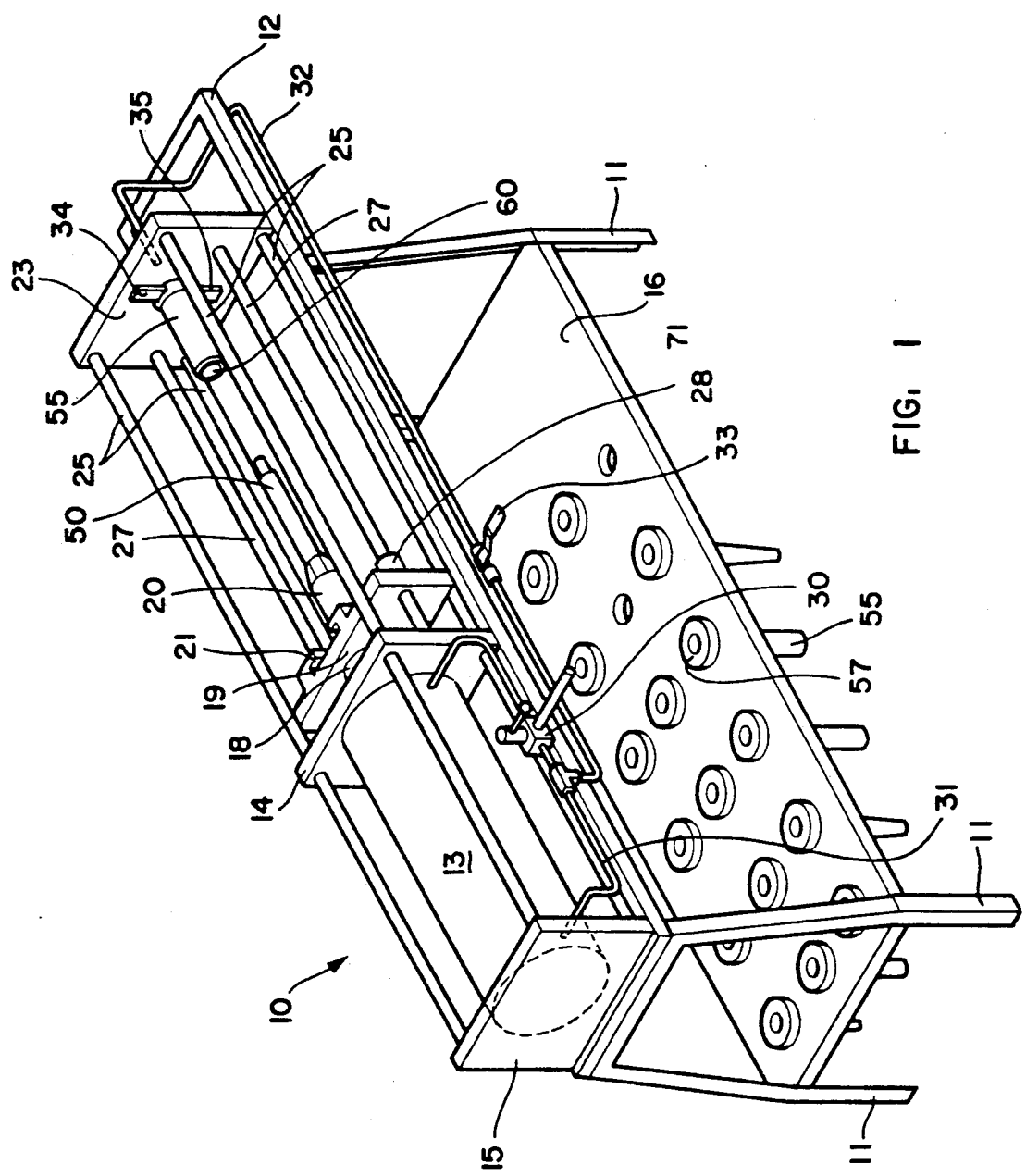
FIGS. 1-3 are perspective views of the apparatus according to a preferred embodiment of the invention applying a cover to a top roll mandrel.

Referring now specifically to the drawings, an apparatus for applying and removing a cover from a top roll mandrel according to the present invention is illustrated in FIG. 1 and shown generally at reference numeral 10. Apparatus 10 in the preferred embodiment as shown in the drawings includes legs 11 which support a rectangular frame 12 on which the operating components are mounted, as described below. An attachment platform 16 is attached to legs 11 below frame 12 and holds a number of cover removing and applying attachments. Top roll movement means are mounted on the frame 12 and comprise a cylinder and piston assembly 13 mounted between front and rear cylinder support plates 14 and 15. The cylinder and piston assembly 13 has a six inch (15 cm) 2 way cylinder. A piston rod 18 extends from one end of the cylinder and piston assembly 13 and carries a chuck mounting plate 19. The piston of the cylinder and piston assembly 13 has a 16 inch (41 cm) stroke. Top roll holding means in the form of a universal chuck 20 is mounted in a vertically-oriented slot 21 in the chuck mounting plate 19.

Attachment holding means comprising an attachment holding plate 23 is mounted on the end of frame 12 opposite from the rear cylinder support plate 15. Four guide rails 25 are attached by respective opposing ends to and extend between the rear cylinder support plate 15 and the attachment holding plate 23. The chuck mounting plate 19 is positioned within the space defined by the four guide rails 25. As piston rod 18 extends towards attachment holding plate 23 the chuck mounting plate 19 is guided in its travel by these guide rails.

A pair of chuck guide rails 27 are secured by opposing ends to and extend between the front cylinder support plate 14 and the attachment holding plate 23. The chuck guide rails 27 also extend though respective bearing journals 28 in the chuck mounting plate 19 so that the chuck mounting plate 19 slides along the chuck guide rails 27 as it traverses the distance between the front cylinder support plate 14 and the attachment holding plate 23.

A two-way control valve 30 is carried by frame 12 and controls the flow of air from a pressurized air source (not shown) though a pneumatic conduit 31 which selectively controls reciprocating movement of the cylinder and piston assembly 13. A pneumatic conduit 32 communicates with the attachment holding plate 23, described in more detail below. Conduit 32 is controlled by a two-way control valve 33.

Still referring to FIG. 1, any one of several types and sizes of attachments can be attached to attachment holding plate 23 by locking dogs 34, 35.

Figure 4:
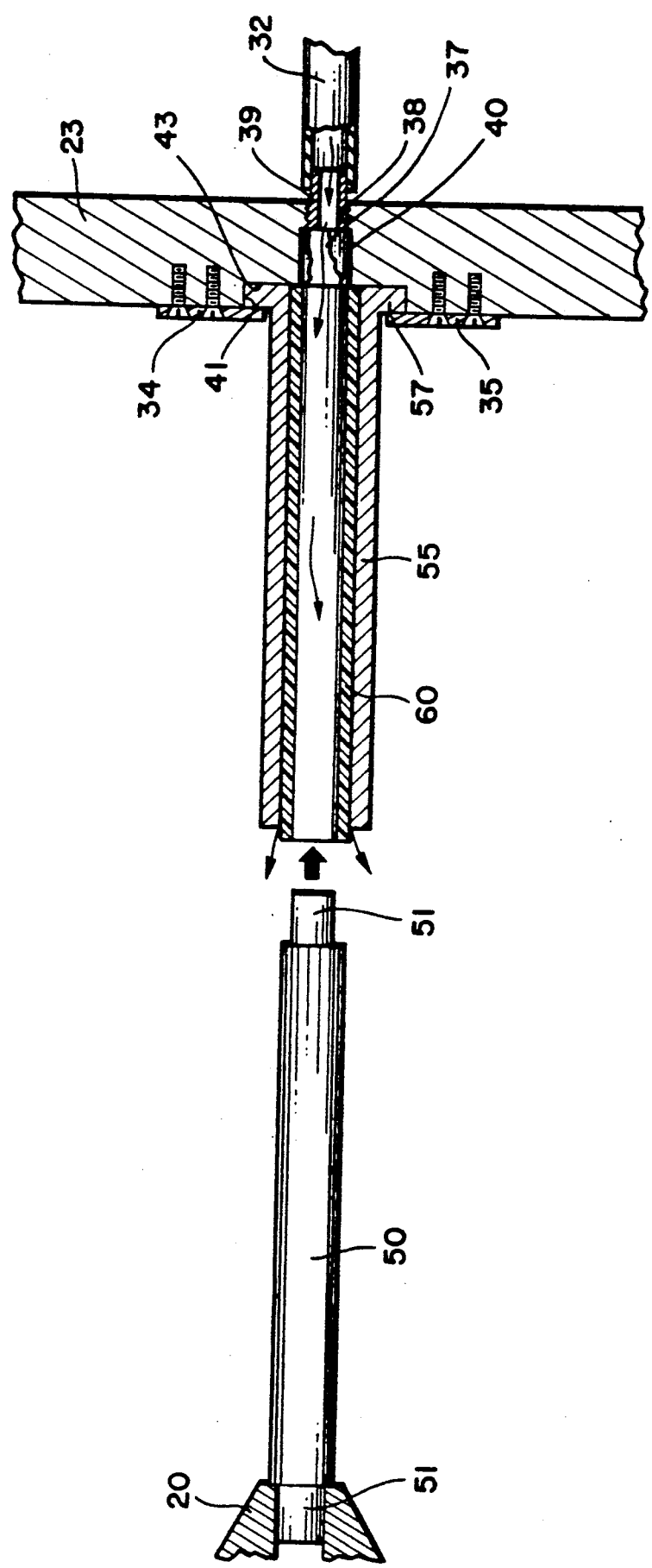
FIGS. 4-7 are fragmentary cross-sectional views of the apparatus according to a preferred embodiment of the invention applying a cover to a top roll mandrel.

Referring now to FIG. 4, attachment holding plate 23 has a air supply bore 37 through from one side to the other. Bore 37 has a first, threaded bore segment 38 for mating with a fitting 39 on conduit 32; a second, larger diameter segment 40 which serves as an annular recess to receive reduced diameter end of a top roll being processed; and a third, still larger diameter segment 41 for receiving a flanged cover applying or removing attachment as described below. As is shown in FIG. 4, locking dogs 34, 35 hold the attachment in place. The segment 41 also defines a radially-extending face 43. A wide variety of attachments may be used depending on the size and length of the roll to be stripped or covered.

Figure 8:
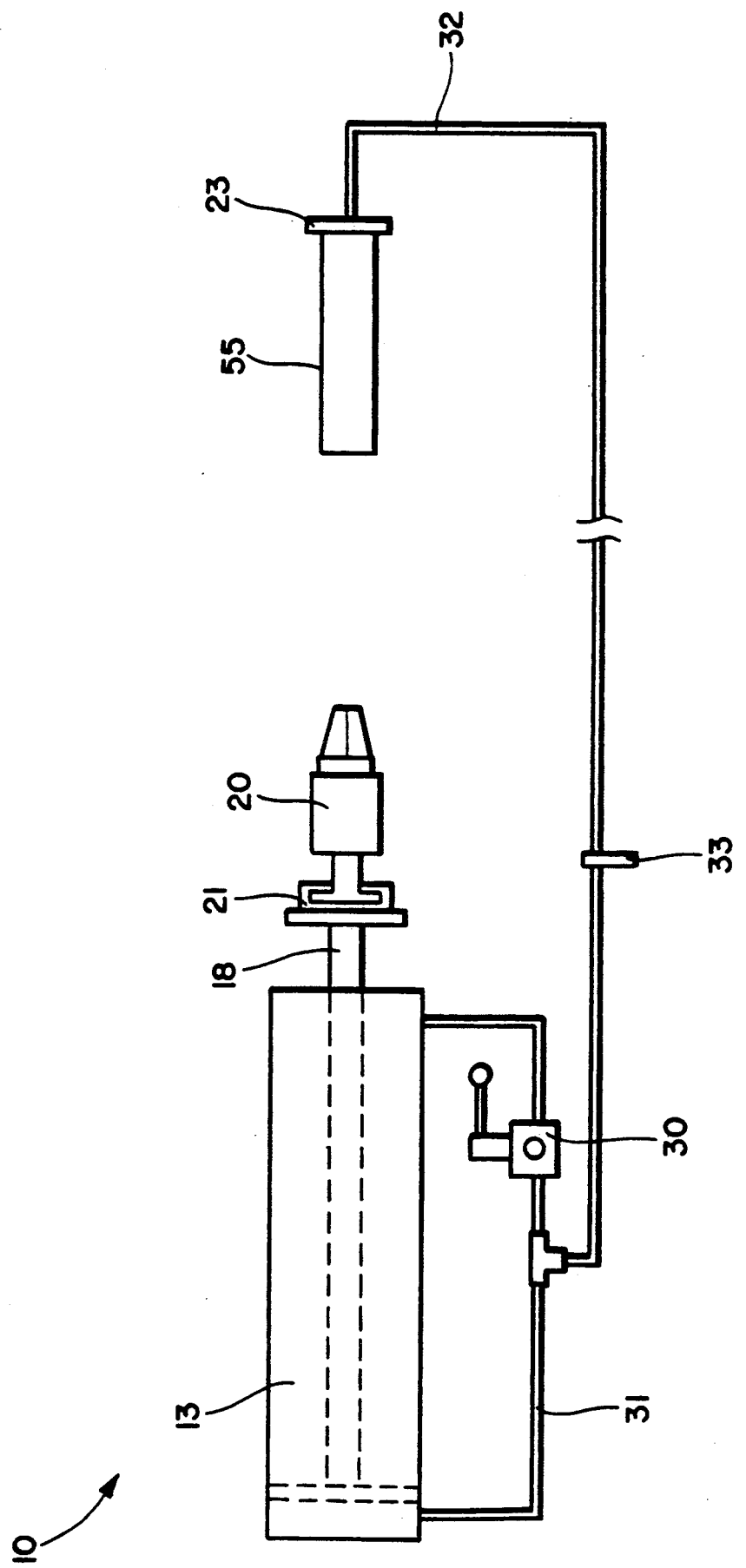
FIG. 8 is a schematic view of the pneumatic system of the apparatus shown in FIGS. 1-7.
Figure 9:
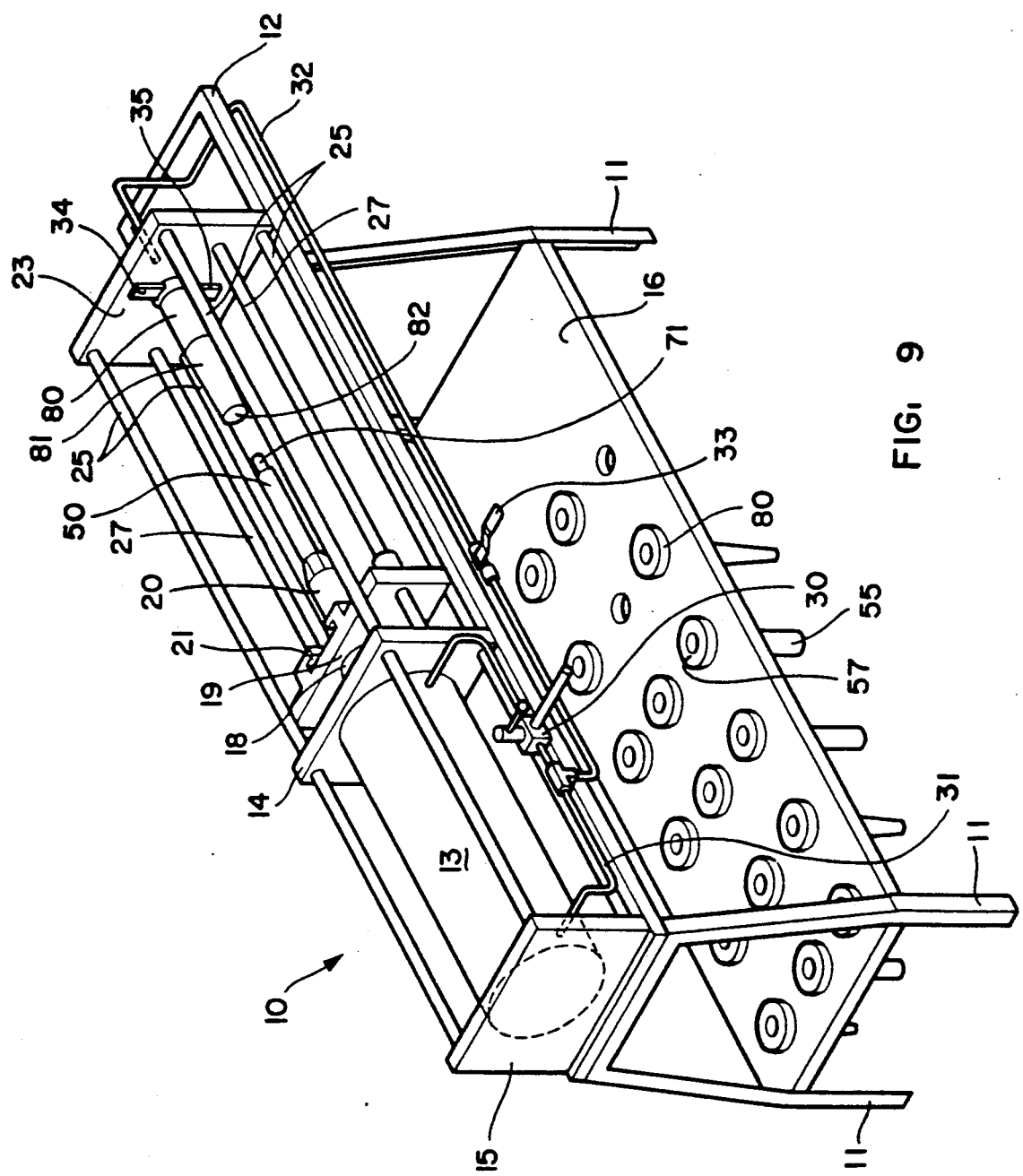
FIGS. 9-13 are perspective views of the apparatus according to a preferred embodiment of the invention removing a cover from a top roll mandrel.

A simplified schematic of the pneumatic system is shown in FIG. 8.

II. Operation of Apparatus to Apply Cover to Mandrel

Referring now to FIGS. 1-7, inclusive, the use of apparatus 10 to apply a cover to a top roll mandrel is illustrated. As is shown in FIG. 1, a top roll mandrel 50 is placed in the chuck 20. The surface of the mandrel 50 is coated with a suitable adhesive.

A suitably sized attachment 55, preferably fabricated from steel, is placed in recess 40 and locked into place. The attachment 55 comprises a hollow cylindrical tube 56 with an enlarged flange 57 for holding the attachment in place. The internal diameter of the attachment 55 should be very slightly larger than the outer diameter of the mandrel 50 with a cover 60 in place over the mandrel. The cover 60 is fabricated of a suitable long wearing elastomeric material and is sized to have an inner diameter slightly smaller than the outer diameter of the mandrel 50. Thus, the cover must be diametrically stretched or expanded slightly to fit over the larger diameter surface of the mandrel 50.

A cover is placed in the attachment as is shown in FIGS. 1 and 4. In FIG. 4 it can be seen that the inner diameter of attachment 55 is slightly larger than the outer diameter of the cover 60. Control 30 is used to activate the cylinder and piston assembly 13, driving the mandrel 50 towards the attachment 55 and the cover 60. Control 33 is also activated, supplying air to conduit 32. At the point shown in FIGS. 1 and 4, the air flows around and through the cover and out of the opposite end of the attachment 55 and cover 60.

Figure 2:
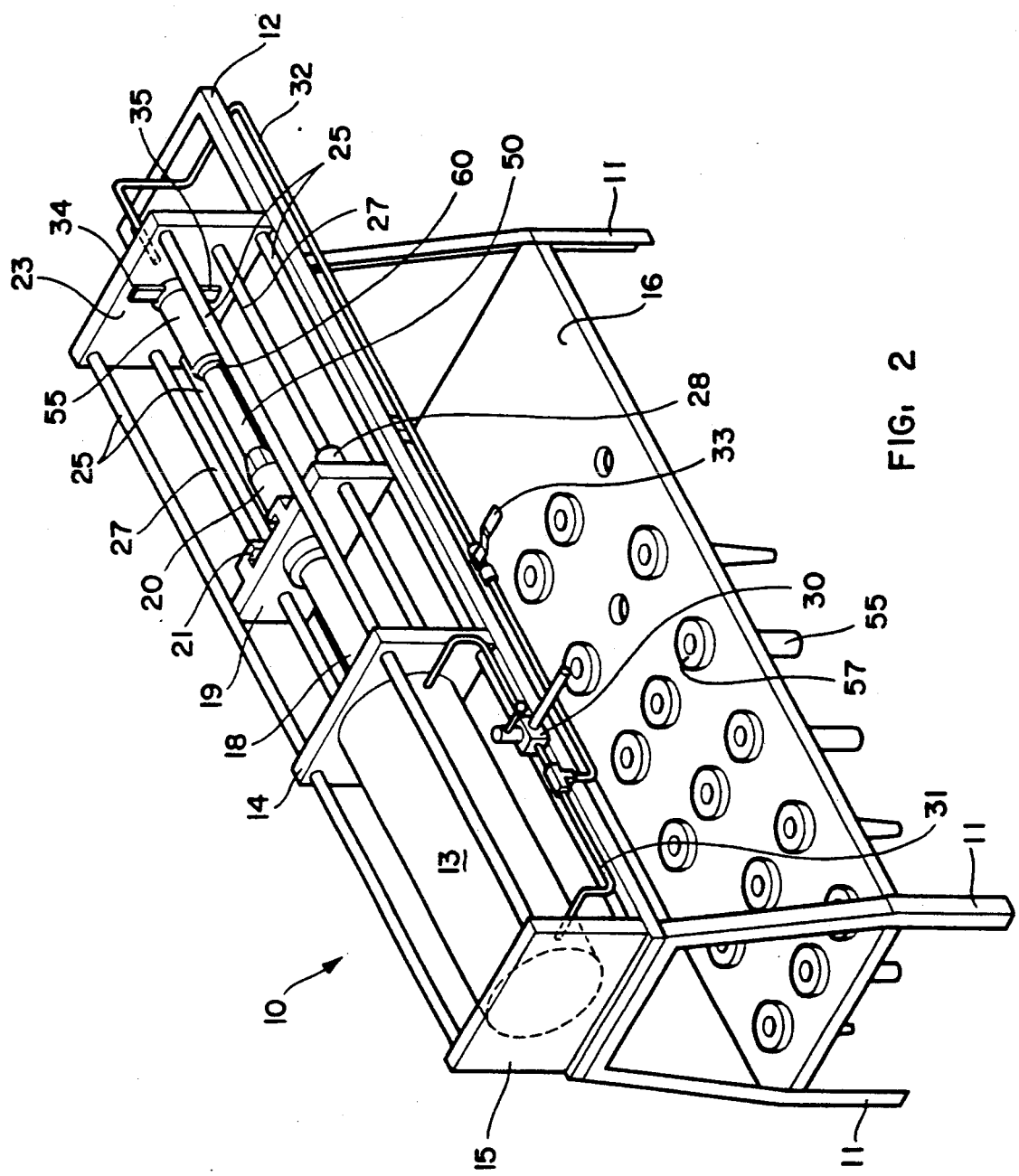
Figure 3:
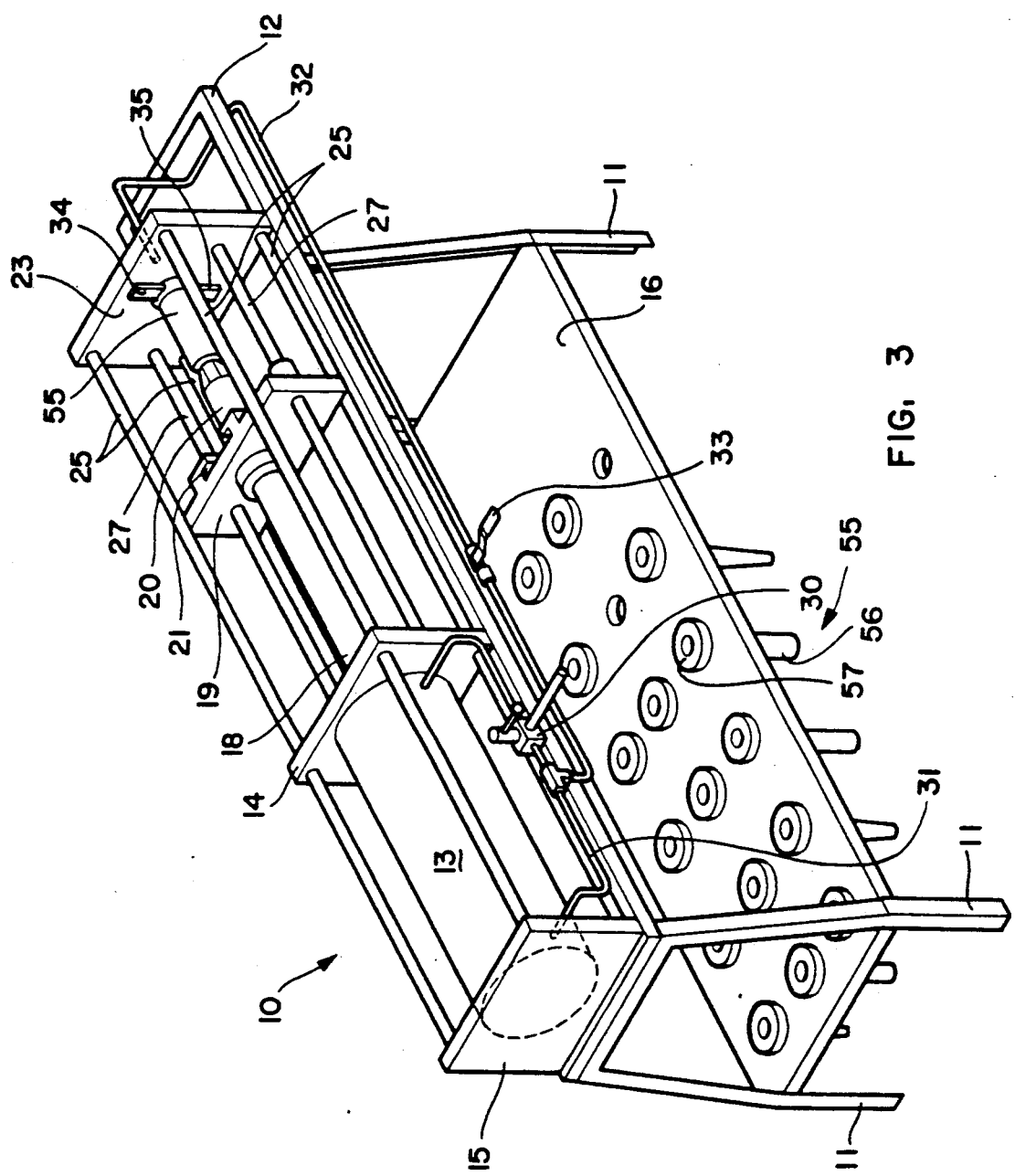
Figure 5:
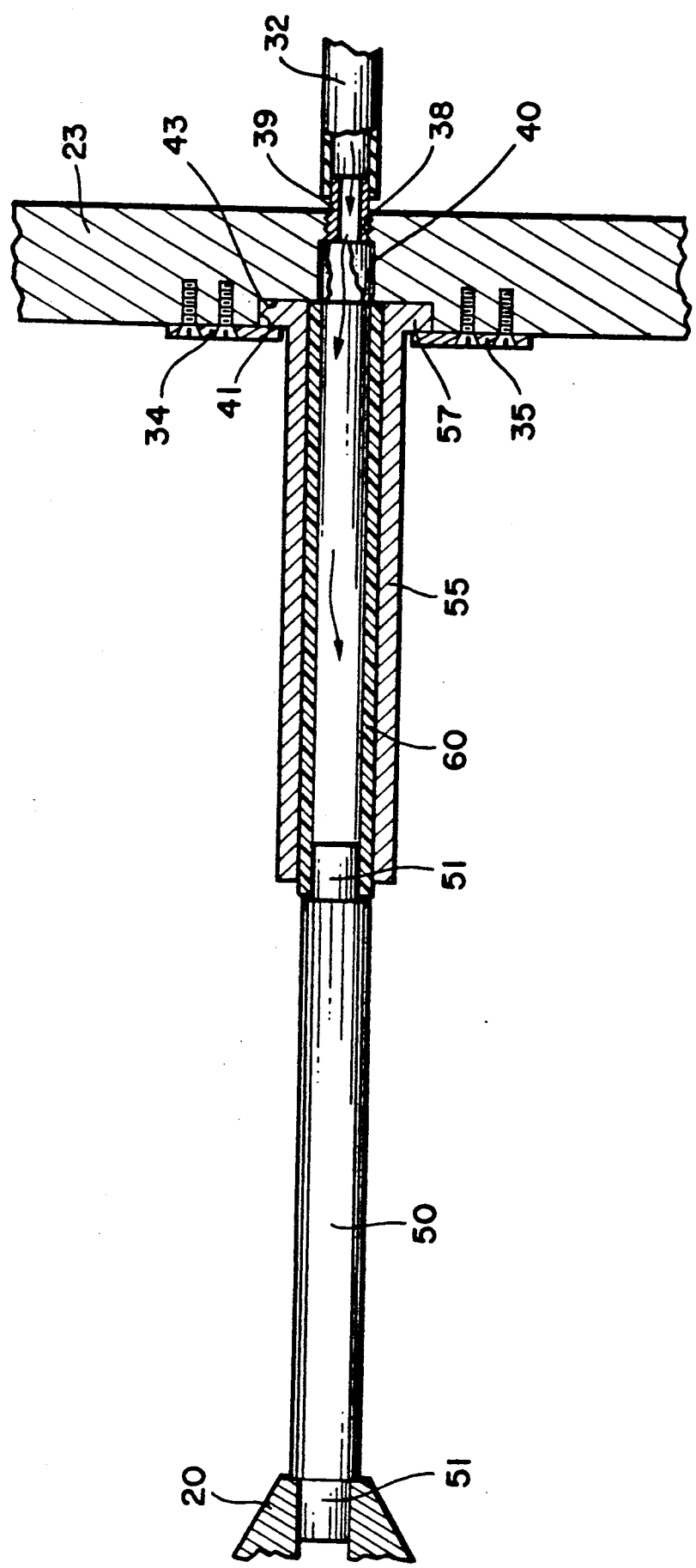

Referring now to FIGS. 2 and 5, the mandrel 50 proceeds towards cover 60 to the point where the reduced diameter end 51 of the mandrel plugs into the end of cover 60 and engages the end of cover 60, sealing it against air passage. At the same time, the force of the mandrel 50 against cover 60 forces cover 60 back into sealing contact with radially-extending face 43.

Figure 6:
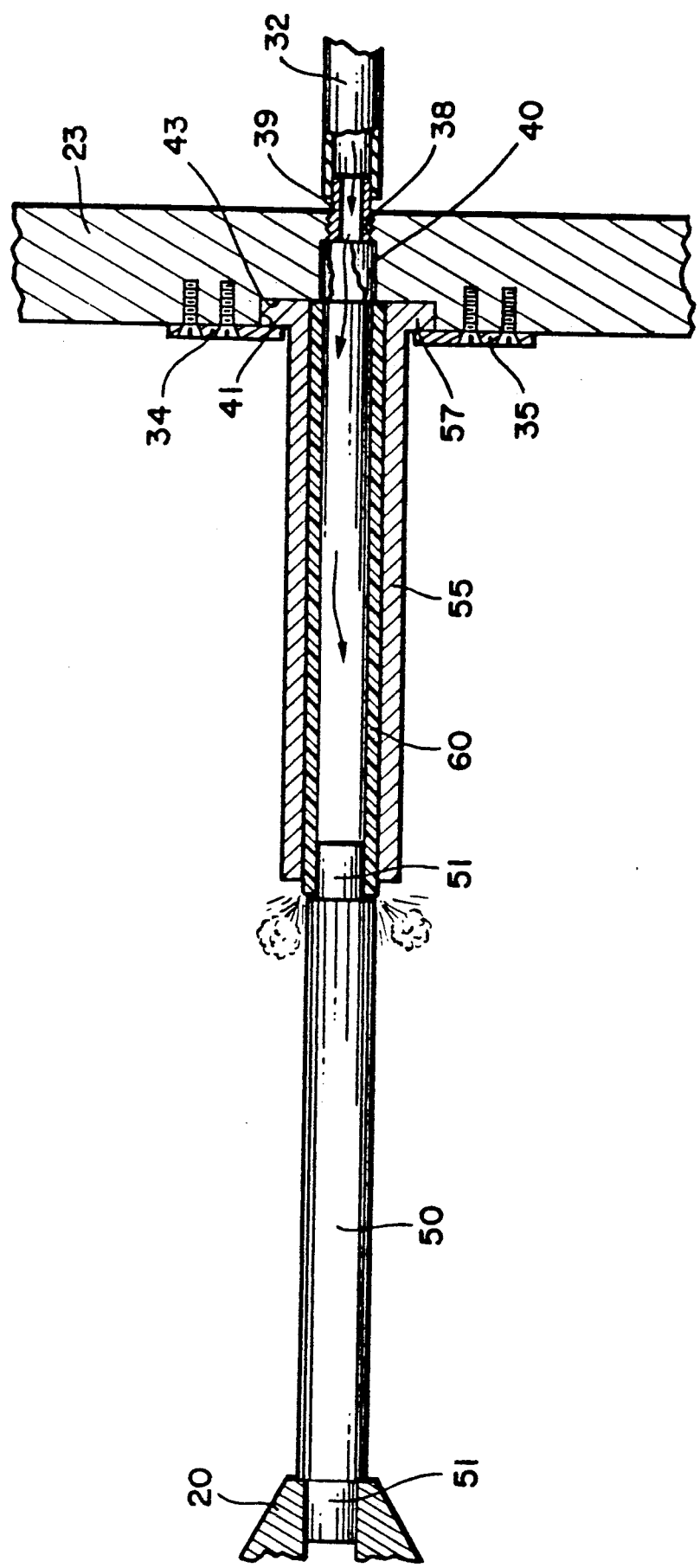

Referring to FIG. 6, at this point the air is no longer free to flow out of the attachment 55 or the cover 60. The air pressure trapped in cover 60 expands the cover 60 into intimate contact with the inner walls of attachment 55, thus increasing the diameter of the cover 60 sufficiently to permit mandrel 50 to pass easily into the hollow core of the cover 60.

Figure 7:
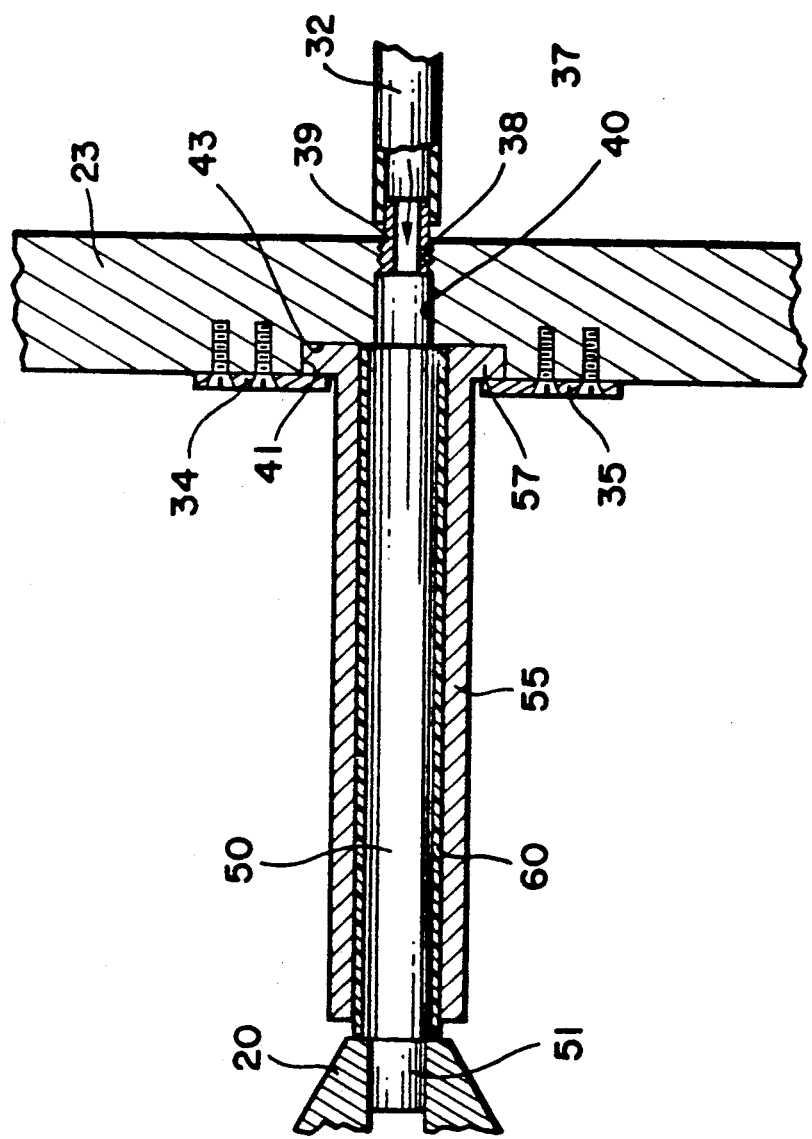

As is shown in FIG. 7, the mandrel 50 continues to move forward and the cover 60 is progressively placed into position on the surface of the mandrel 50. See FIG. 3. At this point cover 60 is properly positioned on mandrel 50 and the adhesive very quickly completes the positive securement of the cover 60 to the mandrel 50. Control 30 is again activated and the mandrel 50 and cover 60—now a unit and referred to as a top roll—are withdrawn. The air supply to the attachment 55 need not be interrupted if the process is to be immediately repeated. The chuck 20 is loosened and the top roll is removed. The process is then ready to be repeated.

III. Operation of Apparatus to Strip Cover from Mandrel

Referring now to FIGS. 9-16, inclusive, use of the apparatus 10 is described with reference to the removal, or "stripping" of a worn out or damaged cover 65 from a top roll mandrel 70.

A worn top roll is secured into chuck 20 by one end 71.

Figure 14:
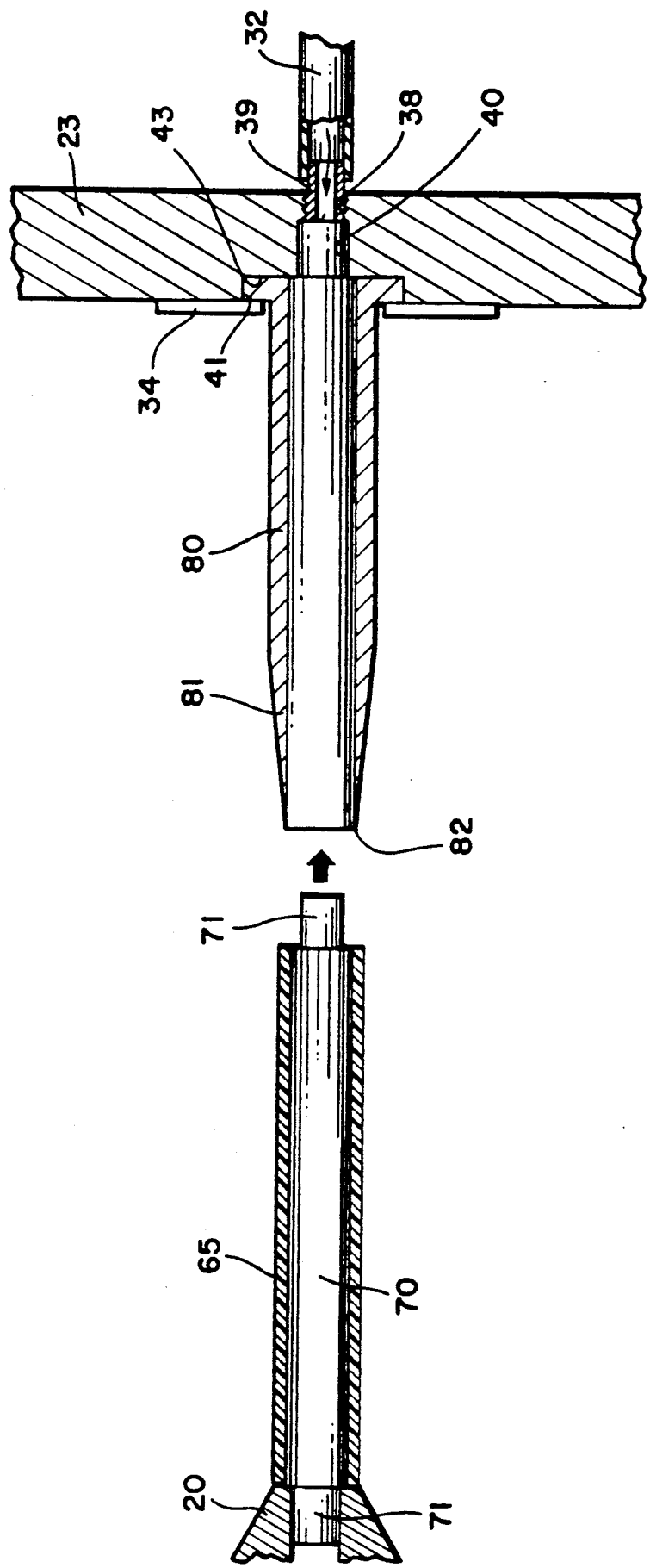
FIGS. 14-16 are fragmentary cross-sectional views of the apparatus according to a preferred embodiment of the invention removing a cover from a top roll mandrel.
Figure 15:
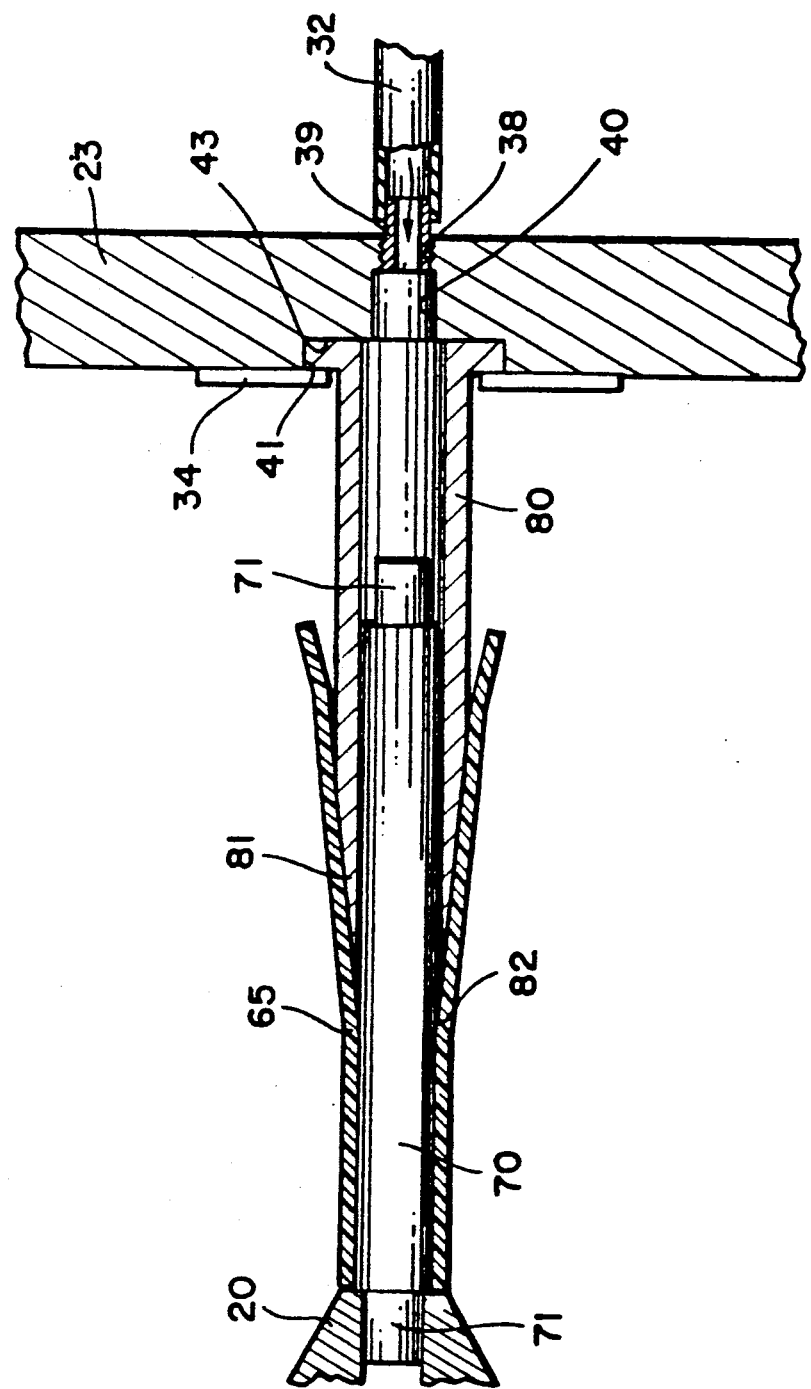

An attachment 80 is placed in the attachment holding plate 23 in the manner shown in FIG. 14. Air to the attachment is not required when the cover is being removed. The attachment 80 comprises a steel tube having an inner diameter which is cylindrical and very slightly greater than the outer diameter of the mandrel 70 but substantially less than the outer diameter of the cover 65. The forward end 81 of attachment 80 has an external taper defining a relatively sharp annular end edge 82. Ideally, this end edge cuts into the cover 65 at the point of contact between the surface of the cover 65 and the mandrel 70.

Figure 10:
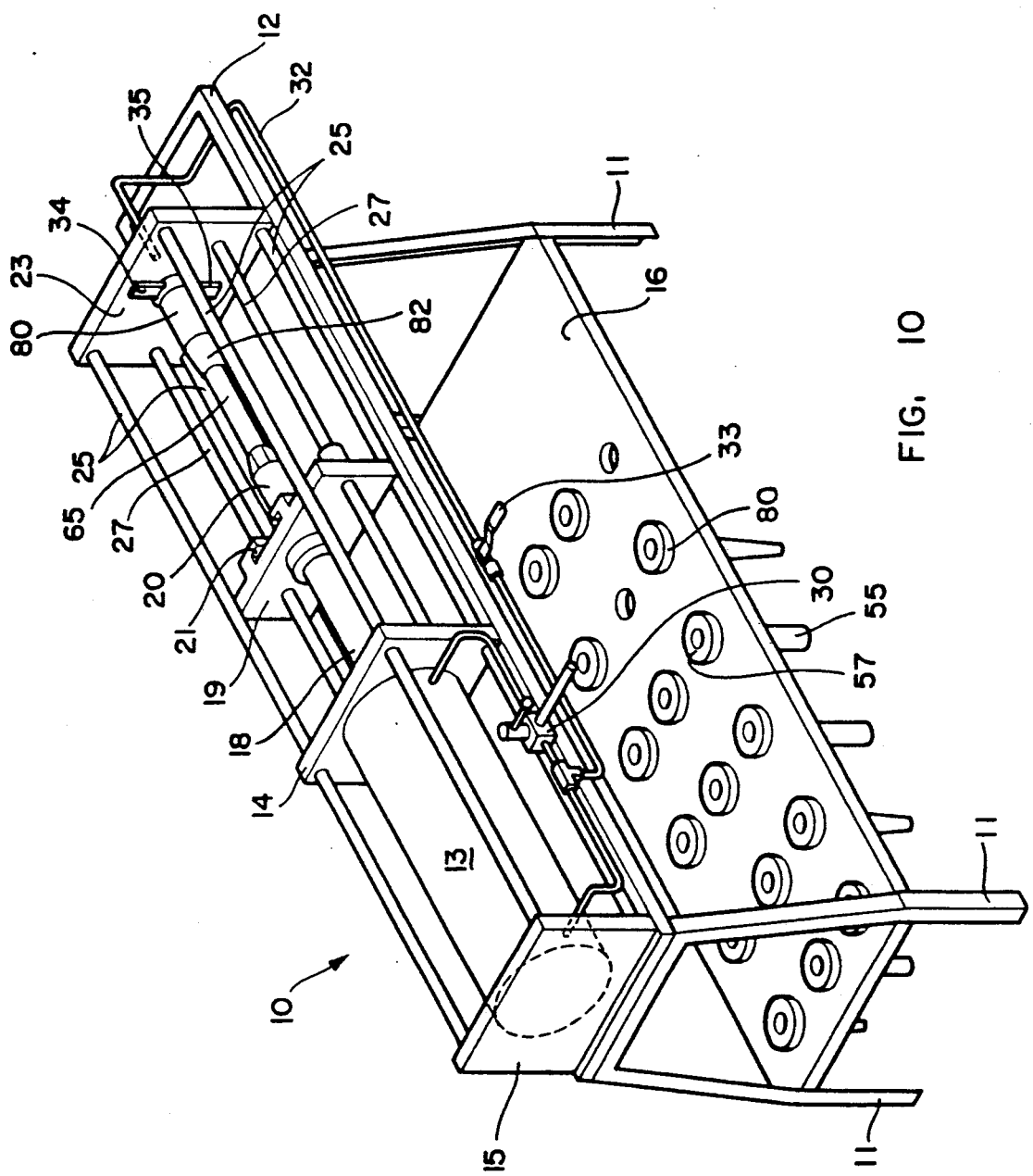
Figure 11:
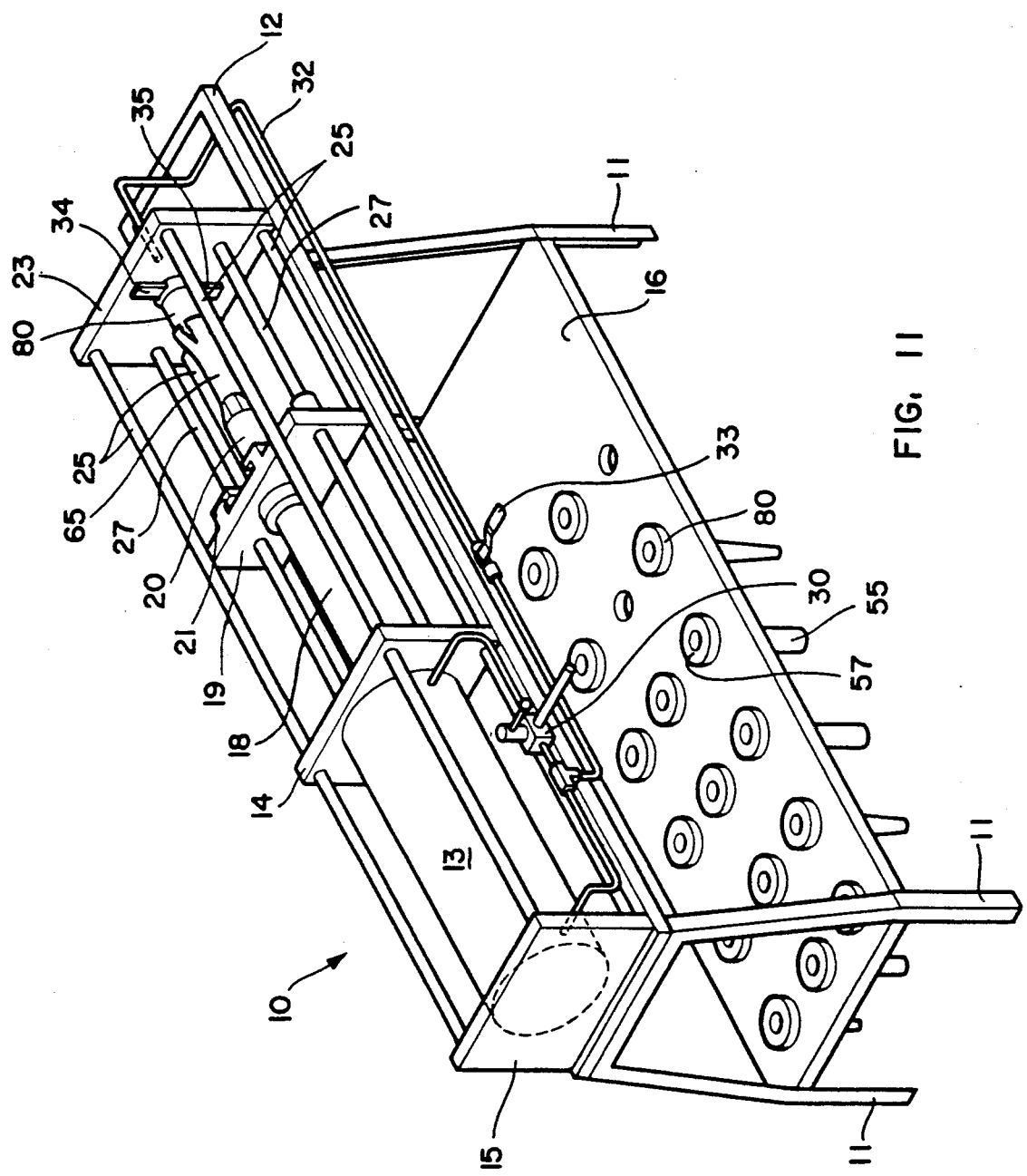

As is also shown in FIGS. 10 and 14, the top roll is then moved towards the attachment 80. The end edge 82 of attachment 80 cuts into the cover 65 around its entire periphery at the point where it contacts the mandrel 70. The tapered end 81 of attachment 80 forces the cover 65 to separate from the mandrel 70 as the mandrel passes into the hollow core of attachment 80.

Figure 12:
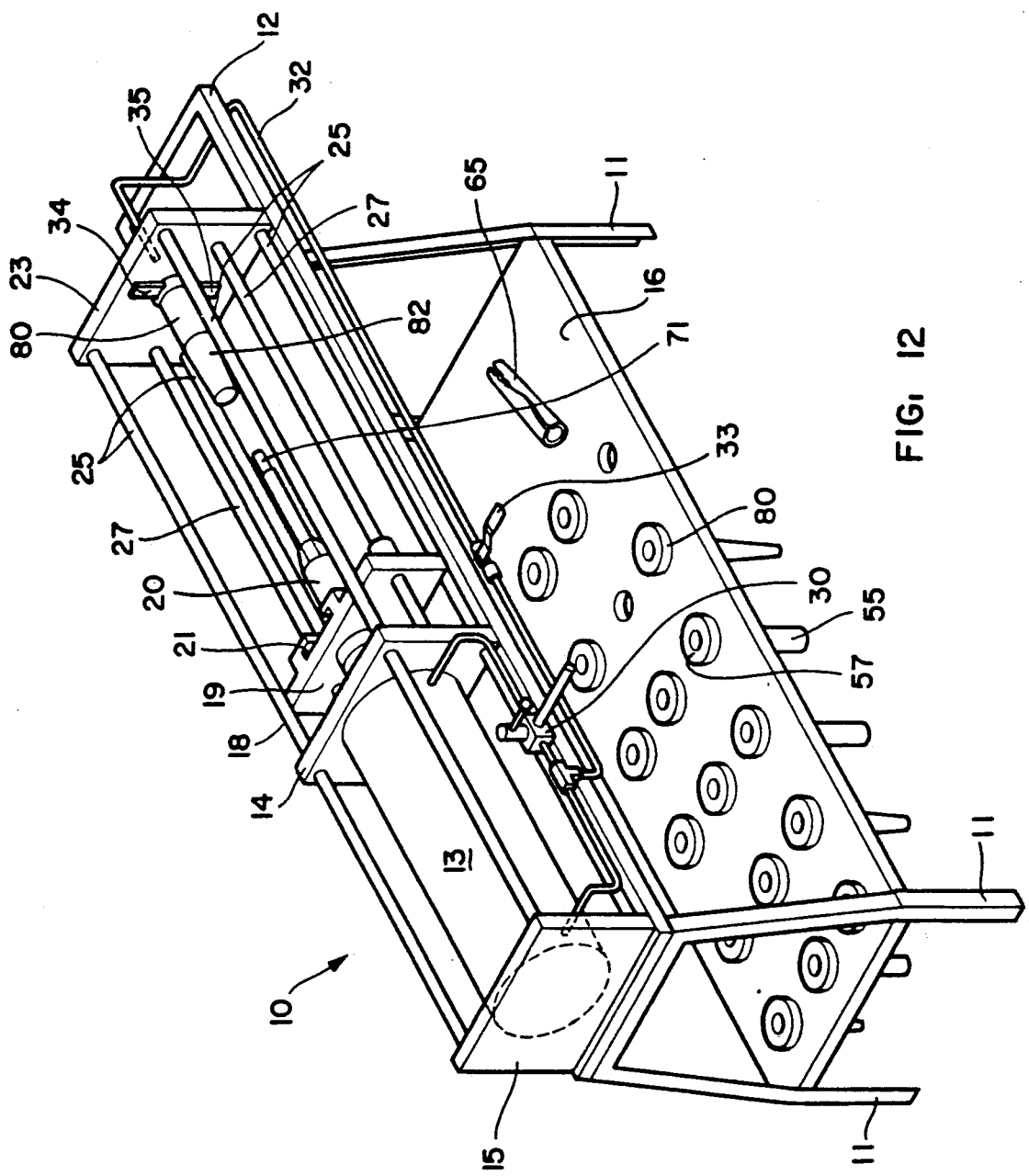
Figure 13:
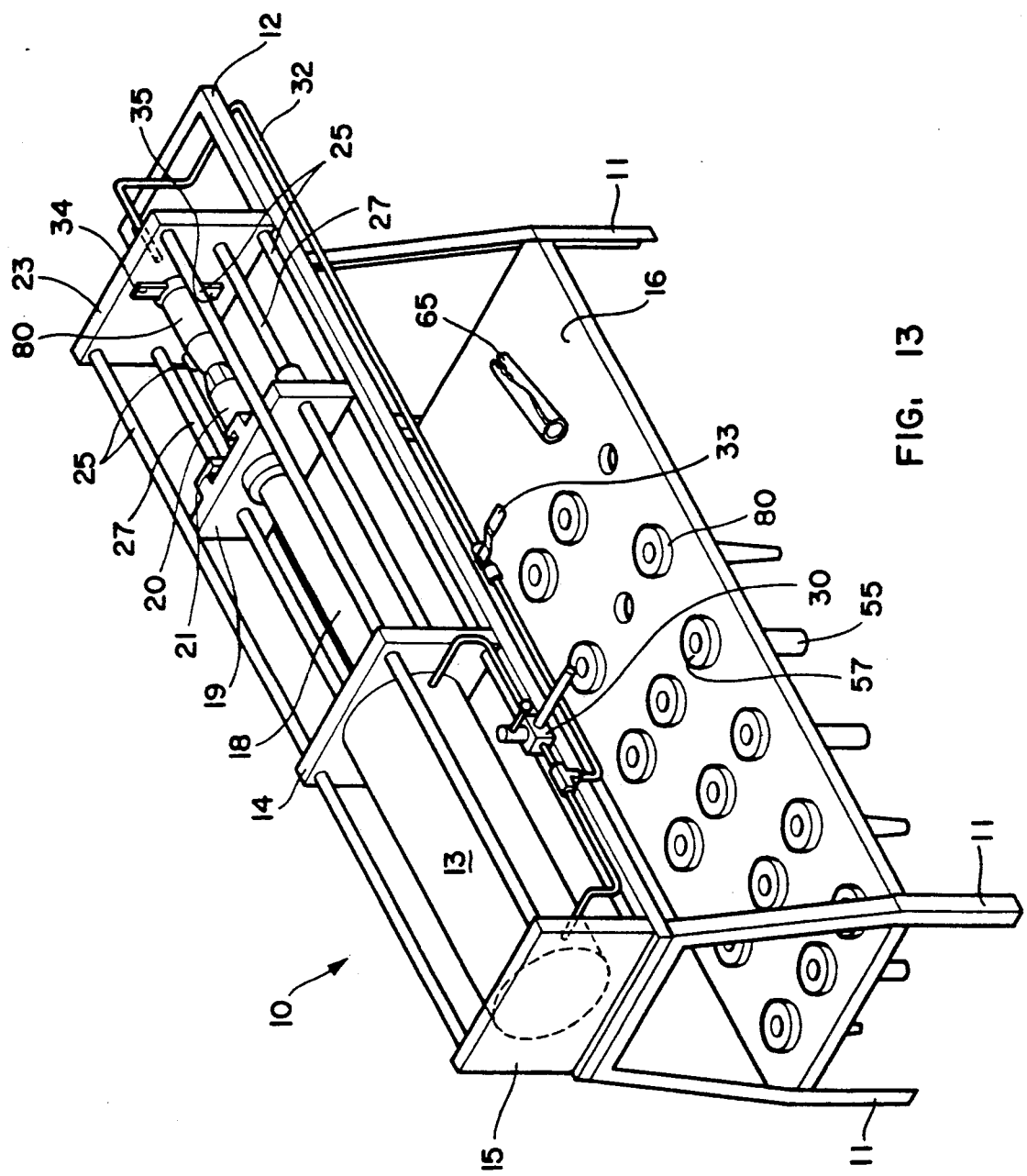

Up to a certain point the cover, being elastomeric, merely stretches as it separates from mandrel 70. However, before the opposite end of mandrel 70 is reached by the end edge 82 of attachment 80, the cover 65 begins to split. See FIG. 11. The split continues down the length of the cover 65 to the point where the entire length of cover 65 is split, causing the cover 65 to be completely separated from the mandrel 70. The cover 65 may cling to attachment 80 or it may fall free of its own accord, as is shown in FIGS. 12 and 16.

Figure 16:
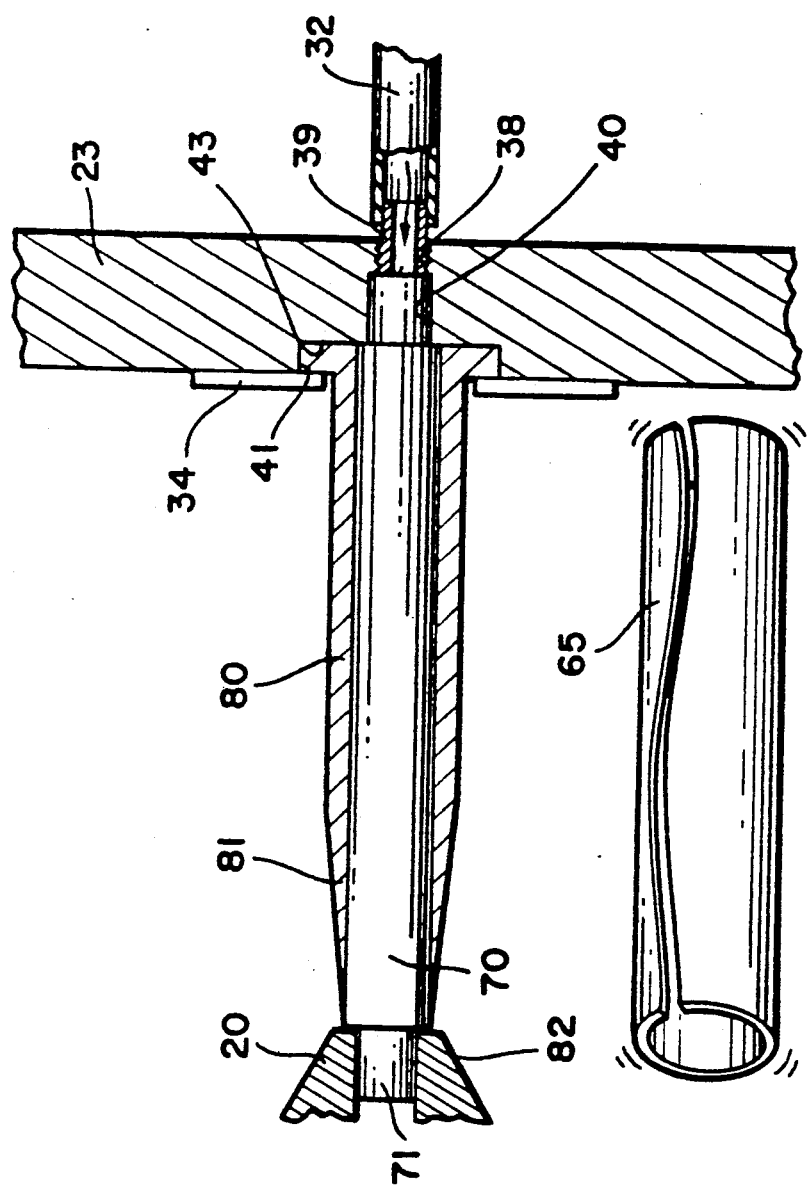

FIG. 16 also shows that the forward end 71 of mandrel 70 is extended into recess 40 at the point when the end edge 82 has completed its transit of the length of the cover 65. After the cover 65 has been removed, the surface of mandrel 70 is quite clean and even, requiring only minimal dressing to put it into condition to receive a new cover in the process described in Section II.

Aside from the speed and uniformity of the processes described above, the manner of removing the cover is quite safe in comparison with older methods, which include grinding or cutting the cover from the mandrel with a razor knife.

While this invention has been described with particular reference to a textile top roll, other types of rolls having elastomeric covers can also be covered and stripped with the apparatus and method as described in the claims.

An apparatus and method for applying and removing a cover from a top roll mandrel is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. An apparatus for removing a cylindrical tubular elastomeric cover from and applying a cylindrical tubular elastomeric cover to a cylindrical top roll mandrel of a top roll, comprising:
   (a) attachment holding means for holding a selected cover removing or cover applying attachment;
   (b) a cover applying attachment for being held by said attachment holding means and for carrying a top roll cover to be applied to said top roll mandrel;
   (c) a cover stripping attachment for being held by said attachment holding means and for stripping a cover from a top roll mandrel, said cover stripping means comprising a tube having an inner diameter slightly greater than the outer diameter of the top roll mandrel and substantially smaller than the outer diameter of the cover whereby when the tube is forced against one end of the top roll and wedged under the cover, the cover is progressively stripped from the top roll mandrel s the top roll mandrel passes into said tube;
   (d) top roll holding means for holding a top roll mandrel with a cover to be removed by the cover stripping attachment or a top roll mandrel without a cover for receiving a cover applied by said cover applying attachment;
   (e) top roll movement means for holding a top roll mandrel for reciprocal movement to and from said attachment holding means and the cover applying attachment or the cover stripping attachment held by said attachment holding means to thereby apply a cover to or remove the cover from the top roll mandrel.

2. An apparatus according to claim 1, wherein said cover applying attachment comprises:
   (a) a tube for receiving a cover to be applied to the top roll mandrel therein; and
   (b) cover expansion means for expanding said cover to an inner diameter sufficient to apply the cover onto the top roll mandrel.

3. An apparatus according to claim 2, wherein said top roll holding means comprises a chuck and said top roll movement means comprises a pneumatic piston and cylinder assembly for reciprocating said chuck and a top roll mandrel carried in said chuck to and from said attachment holding means.

4. An apparatus according to claim 3, wherein said cover expansion means comprises sealing means for sealing opposing ends of the cover and pneumatic inflation means for inflating the cover to increase its diameter sufficiently to permit the top roll mandrel to be received therein.

* * * * *